D. H. SCHMIDT.
FLY TRAP.
APPLICATION FILED AUG. 14, 1911.
1,013,320.
Patented Jan. 2, 1912.
2 SHEETS—SHEET 2.
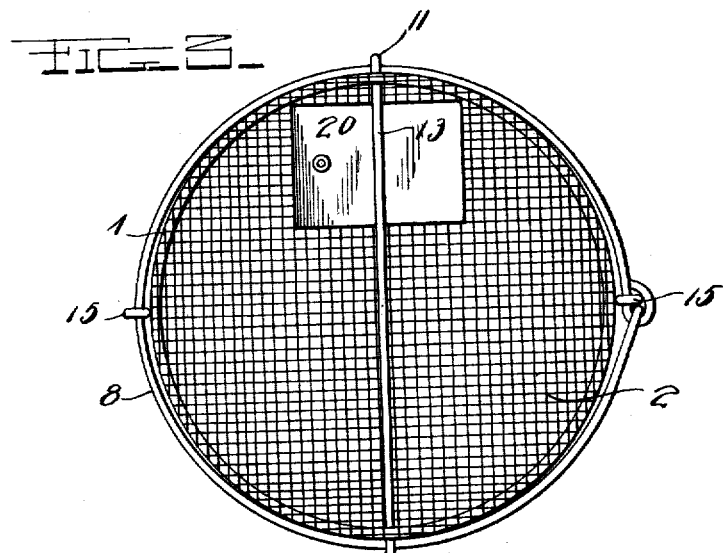
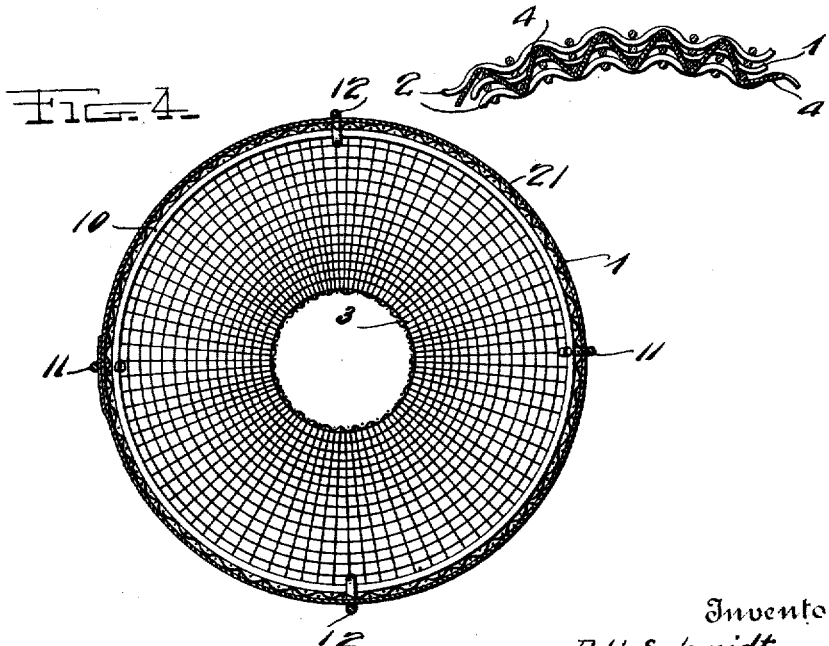
Witnesses
J. P. Pierce
E. W. Somers
Inventor
D. H. Schmidt
by H. B. Willson & Co
Attorneys

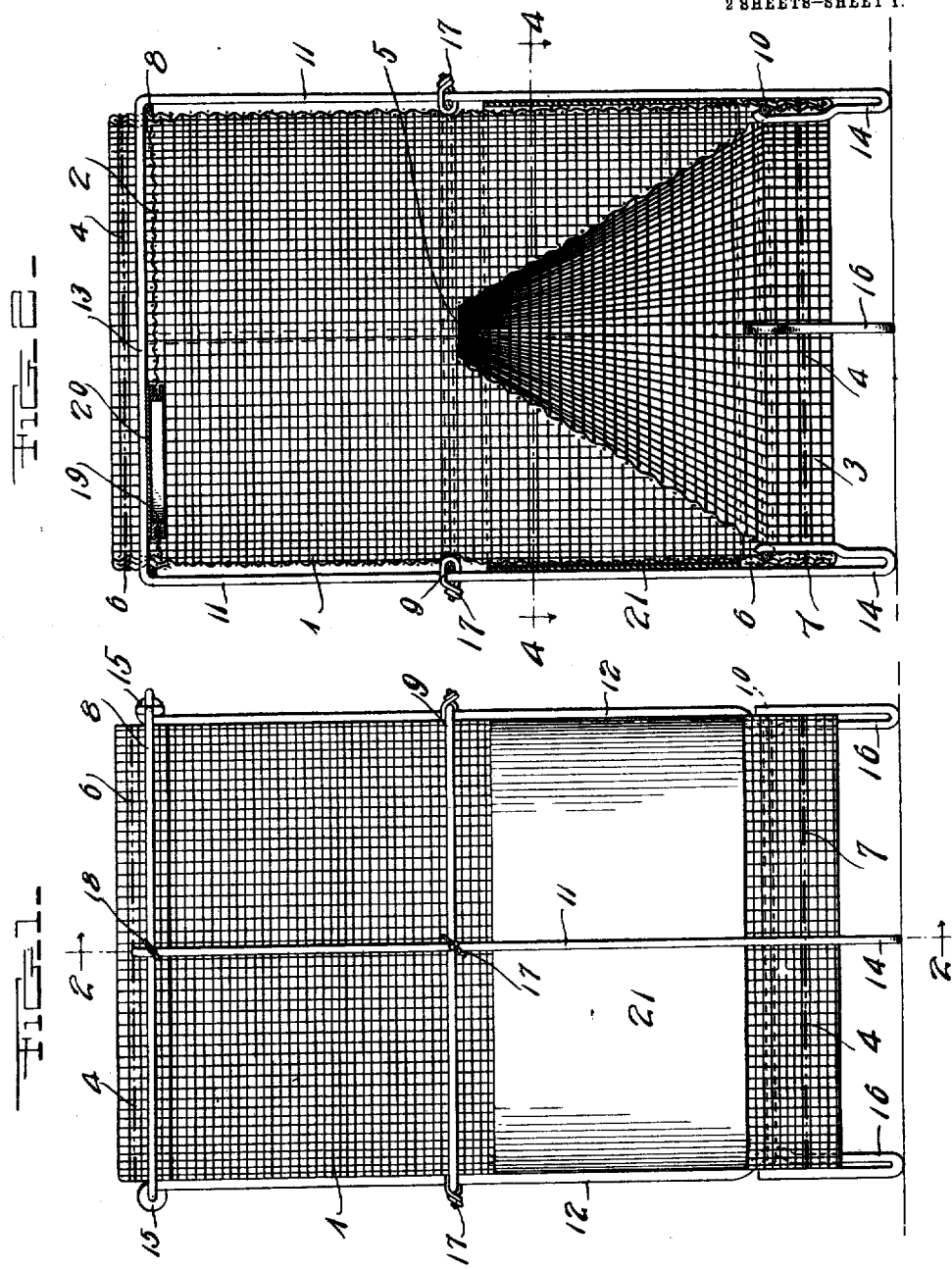

UNITED STATES PATENT OFFICE.

DAVID H. SCHMIDT, OF STEWARTSVILLE, MISSOURI.

FLY-TRAP.

1,013,320.  Specification of Letters Patent.  Patented Jan. 2, 1912.

Application filed August 14, 1911. Serial No. 643,871.

*To all whom it may concern:*

Be it known that I, DAVID H. SCHMIDT, a citizen of the United States, residing at Stewartsville, in the county of Dekalb and State of Missouri, have invented certain new and useful Improvements in Fly-Traps; and I do declare the following to be a full, clear, and exact description of the invention, such as will enable others skilled in the art to which it appertains to make and use the same.

This invention relates to improvements in fly traps.

One object of the invention is to provide a fly trap having a suitably supported and braced body portion formed entirely of wire netting and having means whereby the insects will be directed up into the trap.

A further object is to provide a trap of this character which will be simple, strong, durable and inexpensive in construction, efficient in operation and well adapted to the purpose for which it is designed.

With these and other objects in view, the invention consists of certain novel features of construction, combination and the arrangement of parts as will hereinafter be more particularly described and afterward specifically claimed.

In the accompanying drawings: Figure 1 is a side view of my improved trap; Fig. 2 is a vertical longitudinal section thereof; Fig. 3 is a top plan view; Fig. 4 is a horizontal sectional view; Fig. 5 is an enlarged detail section through the meeting edges of the sides and top or bottom, showing the manner of connecting or fastening these parts together.

My improved fly trap comprises a body portion which may be of any suitable size and shape and is here shown as being of cylindrical form and comprises sides 1, a top 2, and a bottom 3, each of which is formed of wire netting. The edges of the top 2 are bent upwardly and then downwardly to form an annular channel with which the upper edge of the side 1 is engaged. The top when thus engaged is secured to the upper edge of the side by a thread or fine wire 4 which is laced back and forth or sewed through the upwardly and downwardly bent edges of the top and the engaging upper edge of the side as shown.

The bottom 3 of the trap is in the form of a cone which extends a suitable distance up into the body of the trap and is provided in its upper end with an inlet opening 5 through which the flies may enter the trap. The lower edge of the cone-shaped bottom 3 is bent upwardly as at 6 and is engaged with the lower edge of the side 1, said lower edge being seated in the space between the outer side of the cone and said upwardly turned edge thereof, as shown. When thus engaged, the lower edge of the side and the adjacent portions of the bottom are fastened together by a wire or thread 7, which is laced or sewed back and forth through these parts as shown.

The body of the trap is supported in a suitable frame comprising an upper wire ring or band 8, an intermediate wire ring or band 9 and a lower ring or band 10. The upper and intermediate rings 8 and 9 are arranged around the outer side of the body portion of the trap and are held in position by vertically disposed bracing and supporting standards 11 and 12, said standards being formed of wire rods of suitable size and strength to firmly support the trap. The standards 11 are connected at their upper ends by an integral transverse bar 13 which extends across the center of the top of the trap and passes through the engaging edges of the top and side as shown. The lower ends of the standards 11 are bent inwardly and upwardly upon themselves and into engagement with the lower edges of the bottom and side of the trap said bent lower ends projecting below the trap a suitable distance to form supporting feet 14. The standards 12 are in the form of wire rods having their upper ends bent into the form of eyes 15 with which the upper ring or band 8 is engaged. The lower ends of the standards 12 are inserted through the engaging edges of the bottom and sides of the trap and are bent upwardly and outwardly into engagement with said edges as shown. The ends of these standards when thus bent form supporting feet 16. The standards 11 and 12 and the intermediate ring or band 9 are secured together and to the sides of the trap by twisted wire loops 17 and the upper ring or band 8 is also preferably secured to the adjacent side of the top by twisted wire loops 18. The lower ring 10 is arranged within the body portion of the trap between the lower edge thereof and the adjacent side of the cone shaped bottom, said ring forming the filling for the tapered space between the lower edge of the side of the trap and the inclined side of the cone, thus preventing dead insects from becoming wedged in between the lower edges of the side and cone.

In the top 2 adjacent to the side of the trap is formed a discharge opening 19 through which the insects may be removed from the trap, said opening being normally closed by a plate 20 which forms the door and is held in position by wedging the same beneath the bar 13 as shown. In order to darken the lower portion of the trap and thus direct the flies upwardly in the cone and through the same into the upper portion of the trap, I provide a covering strip or band 21 formed of paper or other suitable material, and which is adapted to be passed around the outer side of the body of the trap between the same and the standards 11 and 12, said standards thus holding the band in place. By applying the band to the lower portion of the trap as shown, said lower portion will be darkened and will cause the flies to more readily pass through the inlet opening of the cone shaped bottom of the trap and into the upper portion of the latter, as the flies entering the cone will be attracted by the bright light at the upper portion of the trap, as will be readily understood. It will be understood that the band 21 is not absolutely essential to the successful operation of the trap and may be removed if desired.

From the foregoing description taken in connection with the accompanying drawings, the construction and operation of the invention will be readily undertood without requiring a more extended explanation.

Various changes in the form, proportion and the minor details of construction may be resorted to without departing from or exceeding the spirit of the claimed invention.

I claim as my invention:—

1. In a fly trap, a body portion having a bottom extending upwardly thereinto to form an entrance cone and its top provided with an opening having a closure, said bottom having an inlet opening in its apex, a series of bands arranged around the body of the trap, a series of supporting standards secured to the sides of the trap and to said bands, supporting feet formed on the lower ends of said standards, a cross bar formed integral with the upper ends of two of said standards and extending across the top of the trap in engagement with said closure to hold the closure in operative position.

2. In a fly trap, a body portion comprising wire netting sides, a wire netting top secured to the upper edges of said sides, a conically shaped bottom arranged in and secured to the lower edges of the sides, said bottom having in its apex an inlet opening and said top having therein a discharge opening, a door to normally close said discharge opening, a supporting frame comprising a series of bands arranged around the body of the trap, a series of supporting standards secured to the sides of the trap and to said bands, supporting feet formed on the lower ends of said standards, a cross bar formed integral with the upper ends of two of said standards and extending across the top of the trap, said bar forming means for holding the door of the discharge opening in place.

3. In a fly trap, a body portion comprising wire netting sides, top and conically shaped bottom, said sides, top and bottom having their edges formed to provide an interlocking engagement, means to secure the interlocked edges of said parts together, a wire supporting frame, said frame comprising upper and intermediate rings arranged around the outer side of the trap and a lower ring arranged within the body of the trap between the lower edge thereof and the adjacent side of the conically shaped bottom thereby forming a filling for the space between said side and cone shaped bottom of the trap, a series of standards secured to said rings and the adjacent sides of the trap, said standards having their lower ends bent upwardly and into engagement with the joined edges of the bottom and side of the trap, said bent lower ends of the standards forming supporting feet, and a band adapted to be engaged with the lower portion of the body of the trap beneath the standard, whereby said lower portion of the trap is darkened.

In testimony whereof I have hereunto set my hand in presence of two subscribing witnesses.

DAVID H. SCHMIDT.

Witnesses:
   TEMME H. HINDERKS,
   BENJAMIN O. JOHNSON.

---

Copies of this patent may be obtained for five cents each, by addressing the "Commissioner of Patents, Washington, D. C."